(12) United States Patent
Ren (10) Patent No.: US 10,179,379 B2
(45) Date of Patent: Jan. 15, 2019

(54) MULTILAYER BRAZING SHEET FOR VACUUM BRAZE APPLICATIONS

(71) Applicant: Alcoa Inc., Pittsburgh, PA (US)

(72) Inventor: Baolute Ren, Lititz, PA (US)

(73) Assignee: Arconic Inc., Pittsburgh, PA (US)

( * ) Notice: Subject to any disclaimer, the term of this patent is extended or adjusted under 35 U.S.C. 154(b) by 459 days.

(21) Appl. No.: 15/053,201

(22) Filed: Feb. 25, 2016

(65) Prior Publication Data

US 2016/0250720 A1    Sep. 1, 2016

Related U.S. Application Data

(60) Provisional application No. 62/121,148, filed on Feb. 26, 2015.

(51) Int. Cl.

| | |
|---|---|
| *B23K 35/02* | (2006.01) |
| *B23K 35/28* | (2006.01) |
| *B32B 15/01* | (2006.01) |
| *C22C 21/00* | (2006.01) |
| *C22C 21/02* | (2006.01) |
| *C22C 21/08* | (2006.01) |
| *C22C 21/14* | (2006.01) |
| *C22C 21/16* | (2006.01) |
| *C22C 21/18* | (2006.01) |
| *C22C 21/06* | (2006.01) |

(52) U.S. Cl.
CPC ........ *B23K 35/0238* (2013.01); *B23K 35/286* (2013.01); *B23K 35/288* (2013.01); *B32B 15/016* (2013.01); *C22C 21/00* (2013.01); *C22C 21/02* (2013.01); *C22C 21/06* (2013.01); *C22C 21/08* (2013.01); *C22C 21/14* (2013.01); *C22C 21/16* (2013.01); *C22C 21/18* (2013.01)

(58) Field of Classification Search
None
See application file for complete search history.

(56) References Cited

U.S. PATENT DOCUMENTS

| 7,255,932 B1 | 8/2007 | Kilmer | |
|---|---|---|---|
| 2008/0011816 A1* | 1/2008 | Kilmer | B23K 35/002 228/262.51 |
| 2008/0056931 A1 | 3/2008 | Connor et al. | |
| 2010/0304175 A1 | 12/2010 | Kilmer | |

FOREIGN PATENT DOCUMENTS

| CA | 2593276 A1 | 4/2006 |
|---|---|---|
| CA | 2721747 A1 | 10/2009 |
| JP | 2001225187 | * 8/2001 |

OTHER PUBLICATIONS

International Search Report and Written Opinion of the International Searching Authority for International Application No. PCT/US16/19494, dated May 6, 2016.

* cited by examiner

*Primary Examiner* — Daniel J. Schleis
(74) *Attorney, Agent, or Firm* — Greenberg Traurig, LLP (57) ABSTRACT

A five layer sheet for vacuum brazing has a core layer of 3XXX aluminum alloy and two interliner layers of 5XXX aluminum alloy bonded to the core layer. Two layers of 4XXX aluminum alloy are bonded to the two interliner layers. An elevated quantity of Mg in the interliner layers can provide enhanced strength, facilitate brazing and provide corrosion protection. A low zinc composition for the sheet also facilitates vacuum brazing.

26 Claims, 10 Drawing Sheets

FIG. 1

| Pre braze particle structure. | Pre braze grain structure. | Post braze particle structure. | Post braze grain structure. |
|---|---|---|---|
| FIG. 2A | FIG. 2B | FIG. 2C | FIG. 2D |

| Pre braze particle structure. | Pre braze grain structure. | Post braze particle structure. | Post braze grain structure. |
|---|---|---|---|
| FIG. 3A | FIG. 3B | FIG. 3C | FIG. 3D |

FIG. 4A Pre braze particle structure.
FIG. 4B Pre braze grain structure.
FIG. 4C Post braze particle structure.
FIG. 4D Post braze grain structure.

FIG. 5A Pre braze particle structure.
FIG. 5B Pre braze grain structure.
FIG. 5C Post braze particle structure.
FIG. 5D Post braze grain structure.

FIG. 6A Pre braze particle structure.
FIG. 6B Pre braze grain structure.
FIG. 6C Post braze particle structure.
FIG. 6D Post braze grain structure.

FIG. 7A Pre braze particle structure.
FIG. 7B Pre braze grain structure.
FIG. 7C Post braze particle structure.
FIG. 7D Post braze grain structure.

FIG. 8A Pre braze particle structure.
FIG. 8B Pre braze grain structure.
FIG. 8C Post braze particle structure.
FIG. 8D Post braze grain structure.

FIG. 9A Stretched 2.5%
FIG. 9B Stretched 5%
FIG. 9C Stretched 7.5%
FIG. 9D Stretched 10%

FIG. 10A Stretched 2.5%
FIG. 10B Stretched 5%
FIG. 10C Stretched 7.5%
FIG. 10D Stretched 10%

FIG. 11A Stretched 2.5%
FIG. 11B Stretched 5%
FIG. 11C Stretched 7.5%
FIG. 11D Stretched 10%

Stretched 2.5% FIG. 12A  Stretched 5% FIG. 12B  Stretched 7.5% FIG. 12C  Stretched 10% FIG. 12D

Stretched 2.5% FIG. 13A  Stretched 5% FIG. 13B  Stretched 7.5% FIG. 13C  Stretched 10% FIG. 13D

Stretched 2.5% FIG. 14A  Stretched 5% FIG. 14B  Stretched 7.5% FIG. 14C  Stretched 10% FIG. 14D

Stretched 2.5% FIG. 15A  Stretched 5% FIG. 15B  Stretched 7.5% FIG. 15C  Stretched 10% FIG. 15D

B08-0210, Core-1 3 layer

Fig. 16A

B12-0084, Core-1 I/L 5 layer

Fig. 16B

B12-0085, Core-1 I/L-3 5 layer

Fig. 16C

B08-0086, Core-2 I/L-1 5 layer

Fig. 16D

B12-0087, Core-2 I/L-2 5 layer

Fig. 16E

B12-0089, Core-2 I/L-3 5 layer

Fig. 16F

B08-0210,
Core-1 3 layer

Fig. 17A

B12-0084, Core-1 I/L 5 layer

Fig. 17B

B12-0085, Core-1 I/L-3 5 layer

Fig. 17C

B08-0086, Core-2 I/L-1 5 layer

Fig. 17D

B12-0087, Core-2 I/L-2 5 layer

Fig. 17E

B12-0089, Core-2 I/L-3 5 layer

Fig. 17F

B08-0210,
Core-1 3 layer

Fig. 18A

B12-0084, Core-1 I/L 5 layer

Fig. 18B

B12-0085, Core-1 I/L-3 5 layer

Fig. 18C

B08-0086, Core-2 I/L-1 5 layer

Fig. 18D

B12-0087, Core-2 I/L-5 2 layer

Fig. 18E

B12-0089, Core-2 I/L-3 5 layer

Fig. 18F

B08-0210, Core-1 0359 3 layer

FIG. 19A

B12-0086, Core-2 0373/ I/L-1 5 layer

FIG. 19B

B12-0084, Core-1 0359/ I/L-1 5 layer

FIG. 19C

B12-0087, Core-2 0373/ I/L-2 5 layer

FIG. 19D

B12-0085, Core-1 0359/ I/L-3 5 layer

FIG. 19E

B12-0089, Core-2 0373/ I/L-3 5 layer

FIG. 19F

B08-0210, Core-1 3 layer

FIG. 20A

B12-0086, Core-2 I/L-1 5 layer

FIG. 20B

B12-0084, Core-1 I/L-1 5 layer

FIG. 20C

B12-0087, Core-2 I/L-2 5 layer

FIG. 20D

B12-0085, Core-1 I/L-3 5 layer

FIG. 20E

B12-0089, Core-2 I/L-3 5 layer

FIG. 20F

FIG. 21A — B08-0210, Core-1 3 layer

FIG. 21B — B12-0086, Core-2 I/L-1 5 layer

FIG. 21C — B12-0084, Core-1 I/L-1 5 layer

FIG. 21D — B12-0087, Core-2 I/L-2 5 layer

FIG. 21E — B12-0085, Core-1/I/L-3 5 layer

FIG. 21F — B12-0089, Core-2/I/L-3 5 layer

MULTILAYER BRAZING SHEET FOR VACUUM BRAZE APPLICATIONS

CROSS REFERENCE TO RELATED APPLICATIONS

This application claims the benefit of U.S. Provisional Application No. 62/121,148, entitled Multilayer Brazing Sheet for Vacuum Braze Applications, filed Feb. 26, 2015, which application is incorporated by reference herein in its entirety.

FIELD

The present invention relates to sheet materials and more particularly, to rolled and roll-bonded sheet material having multiple layers, such as those which may be brazed, e.g., in the course of the manufacture of heat exchangers, such as oil coolers for automobile and trucks.

BACKGROUND

Multi-layer brazing sheets made from aluminum alloys are known for use in controlled atmosphere brazing (CAB), but have limitations for use in vacuum brazing. For example, zinc is used as liner or interliner layers for multi-layer brazing sheets to provide corrosion protection, but zinc can contaminate a vacuum braze furnace and have a negative impact on the vacuum brazing process. U.S. Pat. No. 7,255,932 discloses a multi-layer sheet structure, but does not require thermal treatment or homogenization of the core, which promotes a continuous, dense Mn-containing dispersoid band as the interface between the core and the interliner to enhance corrosion protection. Alternative brazing sheet structures, compositions and methods for making them remain desirable.

SUMMARY

The disclosed subject matter relates to a multi-layer sheet material having a core layer of 3XXX aluminum alloy having in weight %: 0.1-2.0 Si, up to 0.7 Fe, 0.1-2.0 Cu, 0.8-1.8 Mn, 0.05-1.2 Mg, up to 0.10 Cr, up to 0.10 Zn, one each of Ti and Zr, or both, 0.10-0.20; a first interliner layer of 5XXX aluminum alloy bonded on one side of the core layer; a second interliner layer of 5XXX aluminum alloy bonded on a second side of the core layer distal to the first interliner layer; a first brazing layer of 4XXX aluminum alloy bonded to the first interliner layer distal to the core layer; and a second brazing layer of 4XXX aluminum alloy bonded to the second interliner layer distal to the core layer, wherein the first and second interliners are formed from an aluminum alloy comprising in weight % 0.1-0.40 Si; 0.1-0.5 Fe; up to 0.05 Cu; up to 0.3 Mn; 0.1-1.10 Mg; up to 0.05 Cr; up to 0.05 Zn; 0.01-0.2 Ti, the remainder being aluminum and impurities.

In another aspect, the core layer is treated by a pre-hot rolling thermal treatment.

In another aspect, the first and second brazing layers have a max Zn level of 0.2 wt %.

In another aspect, the first and second brazing layers have Mg in an amount from 0.16 to 2.5 wt %.

In another aspect, the core layer comprises in wt % 0.1 to 1.0 Si, up to 0.6 Fe, 0.3 to 0.8 Cu, 1.0 to 1.6 Mn, 0.1 to 0.6 Mg, up to 0.03 Cr, up to 0.05 Zn and 0.1-0.2 Ti, the remainder being Al and impurities.

In another aspect, the core layer comprises in wt % 0.05-0.1 Si, 0.1-0.2 Fe, 0.4-0.6 Cu, 1.0-1.3 Mn, 0.1-0.3 Mg, 0.002-0.006 Cr, 0.01-0.02 Zn and 0.15-0.18 Ti.

In another aspect, the core layer comprises in wt % 0.5 to 0.9 Si, 0.3 to 0.7 Fe, 0.4 to 0.7 Cu, 1.0 to 1.5 Mn, 0.2 to 0.5 Mg.

In another aspect, Zn is present in an amount no more than that of an impurity.

In another aspect, at least one of the interliner layers comprise in wt % 0.2-0.4 Si, 0.1-0.2 Fe, 0.01-0.04 Cu, 0.01-0.05 Mn, 0.3-0.5 Mg, 0.01-0.04 Cr, 0.01-0.04 Zn and 0.02-0.08 Ti.

In another aspect, at least one of the interliner layers comprise in wt % 0.1-0.18 Si, 0.13-0.2 Fe, 0.001-0.01 Cu, 0.001-0.005 Mn, 0.4-0.7 Mg, 0.001-0.006 Zn and 0.01-0.02 Ti.

In another aspect, at least one of the interliner layers comprise in wt % 0.1-0.18 Si, 0.13-0.2 Fe, 0.001-0.003 Cu, 0.001-0.005 Mn, 0.5-1.05 Mg, 0.001-0.005 Zn and 0.01-0.02 Ti.

In another aspect, the first brazing layer comprises in wt % 9.0-11.0 Si, up to 1.0 Fe, 0.1-0.3 Cu, up to 0.20 Mn, 0.5-2.5 Mg, up to 0.05 Zn, the remainder being Al and impurities.

In another aspect, the second brazing layer comprises in wt % 11.5-12.5 Si, 0.1-0.3 Fe, 0.1-0.3 Cu, 0.01-0.1 Mn, 0.1-0.2 Mg, 0.001-0.01 Cr, 0.01-0.05 Zn and 0.01-0.02 Ti, the remainder being Al and impurities.

In another aspect, the second brazing layer comprises in wt % 11.5-12.5 Si, 0.1-0.3 Fe, 0.1-0.3 Cu, 0.01-0.1 Mn, 0.1-0.2 Mg, 0.001-0.01 Cr, 0.01-0.05 Zn and 0.01-0.02 Ti, the remainder being Al and impurities.

In another aspect, the first and second brazing layers are the first and second brazing layers of Claim 14.

In another aspect, the first and second brazing layers are the first and second brazing layers of Claim 14.

In another aspect, the clad ratio is 8-18% for the braze layers and 8-18% for the interliner layers.

In another aspect, a sheet material for brazing has a core of a homogenized 3xxx aluminum alloy; a first interliner on a first side of the core; a second interliner on a second side of the core; a first braze liner on the first interliner; and a second braze liner on the second interliner, wherein the first and second interliners are formed from an aluminum alloy having, in weight %; 0.1-0.40 Si; 0.10-0.5 Fe; up to 0.05 Cu; up to 0.3 Mn; 0.3-1.10 Mg; up to 0.05 Cr; up to 0.05 Zn; 0.05-0.2 Ti, the remainder being aluminum and impurities and wherein the first and second braze liners are each formed from a 4xxx aluminum alloy.

In another aspect, the first and second interliners comprise, in weight %, 0.12-0.4 Si.

In another aspect, the first and second interliners comprise in weight %, up to 0.4 Fe.

In another aspect, the first and second interliners comprise, in weight %, up to 0.03 Cu.

In another aspect, the first and second interliners comprise, in weight %, up to 0.3 Mn.

In another aspect, the first and second interliners comprise, in weight %, 0.3-1.0 Mg.

In another aspect, the first and second interliners each comprise, in weight %, up to 0.03 Cr.

In another aspect, the first and second interliners each comprise, in weight %, up to 0.03 Zn.

In another aspect, the first and second interliners each comprise, in weight %, up to 0.3 Fe.

In another aspect, the first and second interliners each comprise, in weight %, 0.08-0.16 Ti.

BRIEF DESCRIPTION OF THE DRAWINGS

For a more complete understanding of the present disclosure, reference is made to the following detailed description of exemplary embodiments considered in conjunction with the accompanying drawings.

DETAILED DESCRIPTION OF EXEMPLARY EMBODIMENTS

Figure 1:
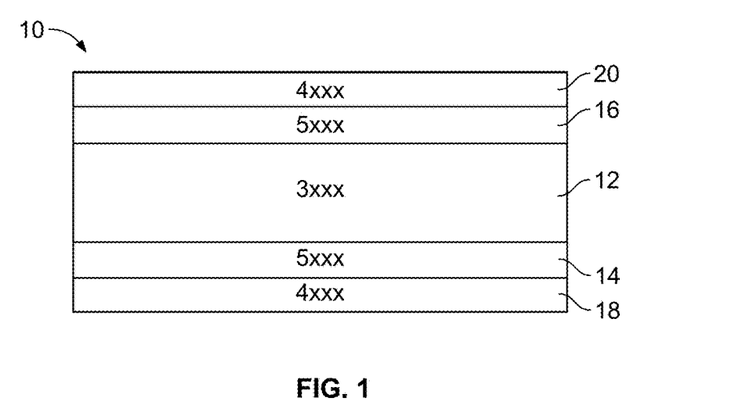
FIG. 1 is a schematic diagram of a multi-layered sheet material in accordance with an exemplary embodiment of the present disclosure.
Figure 2A:
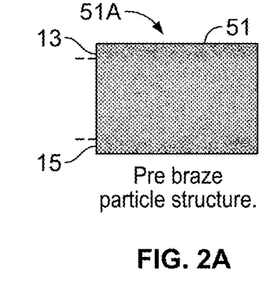
FIGS. 2A-2D are photographs of a cross-section of a sheet material with three layers, showing the pre-braze particle structure, the pre-braise grain structure, the post braze particle structure and the post braze grain structure, respectively.
Figure 2B:
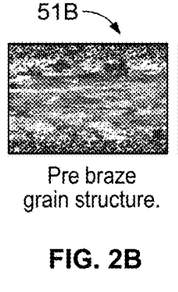
Figure 2C:
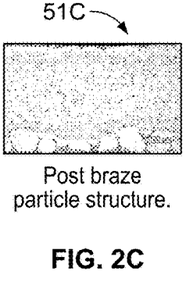
Figure 2D:
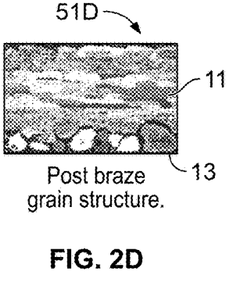

An aspect of the present disclosure is the recognition that for vacuum brazing processes, a brazing sheet containing no zinc avoids zinc contamination of the braze furnace. In some embodiments of the present disclosure, an interliner containing no zinc or only zinc as an impurity can provide good strength and corrosion protection in a multilayer material for vacuum braze applications. In addition, in some embodiments, the interliner has good bond-ability to the core in the hot rolling and roll bonding process. The multilayer sheet 10 architecture is schematically shown in FIG. 1 and has five layers of aluminum alloy, namely, a core layer 12 of the 3XXX type, interliner layers 14, 16 of the 5XXX type and braze liner layers 18, 20 of the 4XXX type.

In accordance with the present disclosure, the following factors were considered to determine the composition of the interliner layers 14, 16: a) keep the alloying elements low, such as copper, manganese, to maintain the anodic electrochemical property of pure aluminum; b) add magnesium to enhance the anodic property, increase the strength, and improve the brazeability in vacuum braze. Mg in the interliner layers 14, 16 can also reduce the flow stress difference between the interliner layers 14, 16 and core 12, which can improve roll bonding in the hot rolling process. In summary, the Mg containing alloy of the interliner layers 14, 16 can provide strength, corrosion protection, good roll bonding properties, good brazeability, good erosion behavior, etc.

In accordance with one embodiment of the present disclosure, the core 12 may be a 3xxx alloy, comprising in weight %:

0.1-1.0 Si,
Up to 0.7 Fe
0.1-1.0 Cu
0.8-1.8 Mn
0.05-1.2 Mg
Up to 0.10 Cr
Up to 0.10 Zn
One of each Ti and Zr, or both, 0.10-0.20.

In some embodiments, the core 12 alloy is treated by a pre-hot rolling thermal treatment, e.g., homogenized, such that the material has good formability. Although the homogenized core cannot form a brown band for corrosion protection, in some embodiments, the interliner provides sacrificial protection.

In some embodiments, for vacuum braze material the 4xxx braze liner normally contains magnesium, such as 4104, 4147, etc. or any 4xxx alloy having 0.3-2.5 wt % Mg.

EXAMPLES

As can be appreciated from the following tables, six exemplary multi-layer sheets 10 with five layers 12, 14, 16, 18, 20, like that of FIG. 1, were formed, i.e., samples B12-0084 through 612-0089, using different combinations of compositions for the five layers, i.e., core layer 12 (Core-1 and Core-2), interliner layers 14 and 16 (I/L-1 through I/L-4) and braze liner layers 18 and 20 (BS Liner-1, BS liner-2). The alternative compositions for the layers 12, 14, 16, 18, 20 are shown in Table 1. The build-up of each of the six five layer samples is shown in Table 2, which shows the specific core layer 12 and interliner layers 14, 16 used for each sample. In each of the five layer samples, a braze liner layer 18, designated "BS Liner-1" in the tables, was applied on one side of the sheet 10 and a braze liner layer 20, designated "BS Liner-2" in the tables, was applied on the other side of the sheet 10. A five layer structure was implemented to improve the corrosion properties of the multi-layer sheets 10. A three layer sheet (sample B08-0210) was also tested for comparison to the five layer sheets 10.

Two core alloys were used for test and evaluation, Core-1 and Core-2. Four interliner alloys (I/L-1 through I/L-4) were used in the testing. The design gauge of each of the samples (both the three layer and the five layer samples) was 0.5 mm, with clad ratios of 11.5% for the braze liners and 12% for the interliner layers in the five layer samples. The experimental samples were all fabricated with 0 temper.

TABLE 1

Experimental sample layer compositions

| | Si | Fe | Cu | Mn | Mg | Cr | Zn | Ti |
|---|---|---|---|---|---|---|---|---|
| BS Liner-1 | 9.0-10.5 | 0.8 Max | 0.25 Max | 0.10 Max | 1.0-2.0 | — | 0.20 Max | — |
| BS Liner-2 | 12.1 | 0.23 | 0.26 | 0.07 | 0.16 | 0.005 | 0.013 | 0.018 |
| Core-1 | 0.07 | 0.17 | 0.47 | 1.09 | 0.24 | 0.004 | 0.017 | 0.164 |
| Core-2 | 0.6-0.84 | 0.4-0.6 | 0.4-0.64 | 1.1-1.4 | 0.3-0.4 | — | 0.05 Max | 0.10-0.20 |
| I/L-1 | 0.33 | 0.15 | 0.03 | 0.03 | 0.34 | 0.03 | 0.03 | 0.05 |
| I/L-2 | 0.12 | 0.17 | 0.001 | 0.002 | 0.52 | 0.000 | 0.003 | 0.016 |
| I/L-3 | 0.13 | 0.18 | 0.002 | 0.002 | 1.03 | 0.000 | 0.002 | 0.016 |
| I/L-4 | 0.13 | 0.17 | 0.002 | 0.002 | 0.57 | 0.20 | 0.002 | 0.016 |

Lab tests were performed to evaluate the experimental samples, including pre and post braze tensile properties, corrosion potentials, erosion behaviors after various pre-strain levels, and SWAAT and OY corrosion properties, as shown in the following tables. The post braze tensile properties were tested after natural aging for 7 days. Pre and post braze tensile properties are shown in Table 2 below.

TABLE 2

| | | | Pre Braze | | | Post Braze | | |
|---|---|---|---|---|---|---|---|---|
| Sample | Core Alloy | Inter Liner Alloy | Tensile Strength (MPa) | Yield Strength (MPa) | Elong. (%) | Tensile Strength (MPa) | Yield Strength (MPa) | Elong. (%) |
| B08-0210 | Core-1 | — | 157.9 | 63.5 | 19.5 | 166.9 | 60.7 | 16.5 |
| B12-0084 | Core-1 | I/L-1 | 133.7 | 55.0 | 20.7 | 150.8 | 57.3 | 17.1 |
| B12-0085 | Core-1 | I/L-3 | 139.3 | 56.8 | 20.5 | 170.1 | 70.1 | 16.0 |

TABLE 2-continued

| Sample | Core Alloy | Inter Liner Alloy | Pre Braze | | | Post Braze | | |
|---|---|---|---|---|---|---|---|---|
| | | | Tensile Strength (MPa) | Yield Strength (MPa) | Elong. (%) | Tensile Strength (MPa) | Yield Strength (MPa) | Elong. (%) |
| B12-0086 | Core-2 | I/L-1 | 133.2 | 53.2 | 19.3 | 184.6 | 73.6 | 16.5 |
| B12-0087 | Core-2 | I/L-2 | 136.0 | 54.8 | 19.5 | 191.5 | 78.4 | 16.1 |
| B12-0088 | Core-2 | I/L-4 | 137.4 | 54.5 | 20.0 | 189.0 | 75.9 | 17.6 |
| B12-0089 | Core-2 | I/L-3 | 139.3 | 55.1 | 19.9 | 203.7 | 87.4 | 15.0 |

As can be appreciated from Table 2, the five layer materials B12-0085, -0086, -0087 and -0089 have a lower pre-braze tensile strength but a higher post braze tensile strength than the three layer sample. These properties can provide good formability for forming the heat exchanger components and high strength for applications.

The corrosion resistance was tested as shown in Table 3 below. The corrosion potential was tested on the post braze samples. The sample surface was removed by etching to obtain the interliner and core samples. The test was performed according to ASTM G69 and the result was determined by averaging two measurements.

TABLE 3

Corrosion potential of the experimental samples

| Sample | Core Alley | Inter Liner Alloy | Core | BS Liner-1 | BS Liner-2 |
|---|---|---|---|---|---|
| B08-0210 | Core-1 | — | | | |
| B09-0269 | Core-1 | — | −671.6 | −692.7 | −681.72 |
| B12-0084 | Core-1 | I/L-1 | −677.4 | −721.6 | −710.10 |
| B12-0085 | Core-1 | I/L-3 | −687.6 | −724.8 | −703.20 |
| B12-0086 | Core-2 | I/L-1 | −695.1 | −719.3 | −713.70 |
| B12-0087 | Core-2 | I/L-2 | −695.6 | −709.1 | −703.84 |
| B12-0088 | Core-2 | I/L-4 | −691.0 | −707.3 | −683.7 |
| B12-0089 | Core-2 | I/L-3 | −691.9 | −716.4 | −702.15 |

The experimental results of corrosion testing show the following properties provided by the interliner layers 14, 16: a) lower pre braze strengths but higher post braze strengths than the 3 layer material; b) good recrystallization behavior, which can significantly improve the erosion behavior at low pre strain and 3) sacrificial protection of the core to improve the corrosion life of the multi-layer material 10.

Examination of Samples—Microstructure

FIGS. 2A-2D through 8A-8D show the pre-braze particle structure, the pre-braze grain structure, the post braze particle structure and the post braze grain structure of each sample referred to above. More particularly, FIGS. 2A-2D show a cross-section of a sample sheet material 51 (sample identified in Tables 2 and 3 as B08-0210 using Core-1) of 0.5 mm gauge with three layers: core layer 11, first braze liner BS-Liner-1 (Table 1) 13, second braze liner BS-Liner-2 (Table 1) 15, showing the pre-braze particle structure 51A, the pre-braze grain structure 51B, the post braze particle structure 51C and the post braze grain structure 51D, respectively. Since FIGS. 2A through 2D are reproductions of real images, the layers 11, 13, 15 in the sheet material 51 in states 51A and 51B are discernable, but not as distinct as they would be if illustrated diagrammatically in a line drawing, such as the illustration of the five layer material 10 in FIG. 1. To aid in visualizing the layers 11, 13, 15, dashed lines are drawn adjacent to the image of the material 51 shown in FIG. 2A. The layers 11, 13, 15 are only illustrated with reference numbers and adjacent dotted lines in the FIG. 2A for ease of illustration, but are also present and visible in FIG. 2B, albeit not explicitly numbered. The post braze states 51C and 51D show diminishment of the braze liner layers 13, 15. Erosion can be seen in the core 11 on the BS Liner-2 side 13 in FIG. 2D (post braze).

FIGS. 3A-3D show a cross-section of a sample sheet material 110 (sample identified in Tables 2 and 3 as B12-0084 with Core-1 alloy and I/L-1 (Interliner-1)) of 0.5 mm gauge with five layers: core layer 112, interliner layers 114, 116, and braze liner layers 118 and 120, showing the pre-braze particle structure 110A, the pre-braze grain structure 110B, the post braze particle structure 110C and the post braze grain structure 110D, respectively. Since FIGS. 3A through 3D are reproductions of real images, the layers 112, 114, 116, 118 and 120 are discernable, but not as distinct as they would be if illustrated diagrammatically in a line drawing, such as the illustration of the five layer material 10 in FIG. 1. To aid in visualizing the layers 112, 114, 116, 118 and 120, dashed lines are drawn adjacent to the image of the material 110 shown in FIG. 3A. The layers 112, 114, 116, 118 and 120 are only illustrated with reference numbers and adjacent dotted lines in FIG. 3A for ease of illustration, but are also present and visible in FIG. 3B, albeit not explicitly numbered. The post braze states 110C and 110D show diminishment of the braze liner layers 118, 120, but the core 112, and interliner layers 114 and 116 are easily discernable. This same approach to illustration is taken for FIGS. 4A-4D through 8A-8D, but shall not be explicitly noted below. Comparing the post braze grain structure shown in FIG. 3D to that shown in FIG. 2D, it can be observed that the post braze microstructures show that the erosion behavior is greatly improved for the 5 layer material 110 at state 110D relative to that shown in FIG. 2D.

FIGS. 4A-4D show a cross-section of a sample sheet material 210 (sample identified in Tables 2 and 3 as B12-0085 using Core-1 and I/L-3) of 0.5 mm gauge with five layers: core layer 212, interliner layers 214, 216 and braze liner layers 218 and 220, showing the pre-braze particle structure 210A, the pre-braze grain structure 210B, the post braze particle structure 210C and the post braze grain structure 210D, respectively. Comparing the post braze grain structure shown in FIG. 4D to that shown in FIG. 2D, it can be observed that the post braze microstructures show that the erosion behavior is improved for the five layer material 210 at state 210D relative to that shown in FIG. 2D. Some erosion is visible on the layer 218 (BS Liner-2) side, but not a significant amount.

FIGS. 5A-5D show a cross-section of a sample sheet material 310 (sample identified in Tables 2 and 3 as B12-0086 with Core-2 alloy and I/L-1) of 0.5 mm gauge with five layers: core layer 312, interliner layers 314, 316, and braze liner layers 318 and 320, showing the pre-braze particle structure 310A, the pre-braze grain structure 310B, the post braze particle structure 310C and the post braze grain structure 310D, respectively. Comparing the post braze grain structure shown in FIG. 5D to that shown in FIG. 2D, it can be observed that the post braze microstructures show that the erosion behavior is improved for the five layer material 310 at state 310D relative to that shown in FIG. 2D. Some erosion is visible on the layer 318 (BS Liner-2) side, but not a significant amount.

FIGS. 6A-6D show a cross-section of a sample sheet material 410 (sample identified in Tables 2 and 3 as B12-0087 with Core-2 alloy and I/L-2) of 0.5 mm gauge with five layers: core layer 412, interliner layers 414, 416 and braze liner layers 418 and 420, showing the pre-braze particle structure 410A, the pre-braze grain structure 410B, the post braze particle structure 410C and the post braze grain structure 410D, respectively. Comparing the post braze grain structure shown in FIG. 6D to that shown in FIG. 2D, it can be observed that the post braze microstructures show that the erosion behavior is improved for the five layer material 410 at state 410D relative to that shown in FIG. 2D.

FIGS. 7A-7D show a cross-section of a sample sheet material 510 (sample identified in Tables 2 and 3 as B12-0088 with Core-2 alloy and I/L-4) of 0.5 mm gauge with five layers: core layer 512, interliner layers 514, 516 and braze liner layers 518 and 520, showing the pre-braze particle structure 510A, the pre-braze grain structure 510B, the post braze particle structure 510C and the post braze grain structure 510D, respectively. Comparing the post braze grain structure shown in FIG. 7D to that shown in FIG. 2D, it can be observed that the post braze microstructures show that some erosion is visible on the layer 518 (BS Liner-2) side, but erosion behavior is improved for the five layer material 510 at state 510D relative to that shown in FIG. 2D.

FIGS. 8A-8D show a cross-section of a sample sheet material 610 (sample identified in Tables 2 and 3 as B12-0089 with Core-2 alloy and I/L-3) of 0.5 mm gauge with five layers: core layer 612, interliner layers 614, 616 and braze liner layers 618 and 620, showing the pre-braze particle structure 610A, the pre-braze grain structure 610B, the post braze particle structure 610C and the post braze grain structure 610D, respectively. Comparing the post braze grain structure shown in FIG. 8D to that shown in FIG. 2D, it can be observed that the post braze microstructures show that the erosion behavior is improved for the five layer material 610 at state 610D relative to that shown in FIG. 2D. Some erosion is visible on the layer 618 (BS Liner-2 side), but only slight.

Erosion Behavior after Pre-Strain

FIGS. 9A-9D through 15A-15D show the post braze microstructure of each sample referred to above after pre-strain at levels of 2.5%, 5%, 7.5% and 10%. More particularly, FIGS. 9A-9D show a cross-section of a sample sheet material 71 (sample identified in Table 3 as B09-0269 with Core-1) of 0.63 mm gauge which had three discernable layers like layers 11, 13, 15 in FIG. 2A. In the post brazing state, only the core 21 remains discernable, the braze liner layers having been diminished. The respective sides of the core 21 that to which the braze liner layers were bonded are identified in FIG. 9A as 21BS1 and 21BS2 indicating BS-Liner-1 and BS-Liner-2, respectively and would also be the same in FIGS. 9B-9D but are not so numbered for ease of illustration. FIGS. 9A-9D show the microstructure after pre-strain of 2.5% (71A), 5% (71B), 7.5% (71C) and 10% (71D), respectively. The erosion levels shown in FIGS. 9A-9D are typical for a core-1 three layer material. At low pre-strain, i.e., 2.5% and 5%, severe erosion occurred during the brazing process.

Figure 3A:
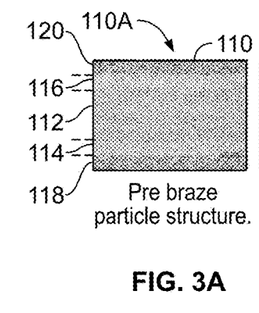
FIGS. 3A-3D are photographs of a cross-section of a sheet material with five layers in accordance with an exemplary embodiment of the present disclosure, showing the pre-braze particle structure, the pre-braise grain structure, the post braze particle structure and the post braze grain structure, respectively.
Figure 3B:
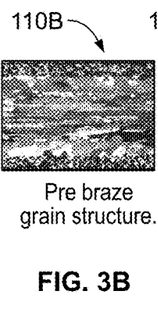
Figure 3C:
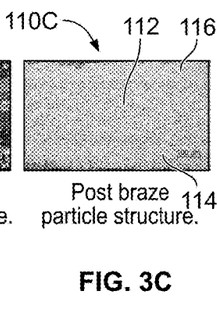
Figure 3D:
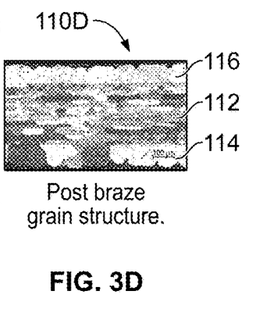

FIGS. 10A-10D show a cross-section of a sample sheet material 710 (sample identified in Tables 2 and 3 as B12-0084 with Core-1 and I/L-1) of 0.5 mm gauge that, in the pre-braze state had five layers like the layers 112, 114, 116, 118, 120 of the material 110 of FIG. 3A. Post braze, the core 712 and interliner layers 714, 716 are discernable. FIGS. 10A-10D show the microstructure after pre-strain of 2.5% (710A), 5% (710B), 7.5% (710C) and 10% (710D), respectively. As shown, the erosion level for each pre-strain level is notably better than that exhibited by the three layer material 71 shown in FIG. 9A.

Figure 4A:
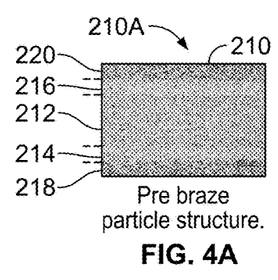
FIGS. 4A-4D are photographs of a cross-section of a sheet material with five layers in accordance with another embodiment of the present disclosure, showing the pre-braze particle structure, the pre-braise grain structure, the post braze particle structure and the post braze grain structure, respectively.
Figure 4B:
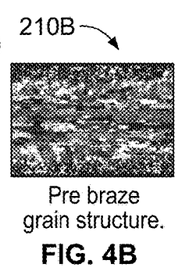
Figure 4C:
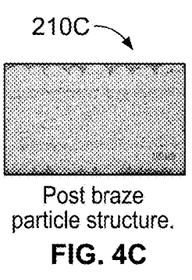
Figure 4D:
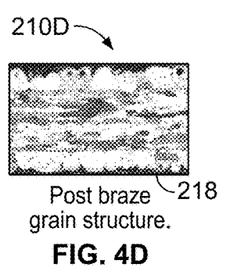

FIGS. 11A-11D show a cross-section of a sample sheet material 810 (sample identified in Tables 2 and 3 as B12-0085 with Core-1 and I/L-3) of 0.5 mm gauge that, in the pre-braze state had five layers, as shown in FIG. 4A. Post braze, the core 812 and interliner layers 814, 816 are discernable. FIGS. 11A-11D show the microstructure after pre-strain of 2.5% (810A), 5% (810B), 7.5% (810C) and 10% (810D), respectively. As shown, the erosion level for each pre-strain level is notably better than that exhibited by the three layer material 71 shown in FIG. 9A.

Figure 5A:
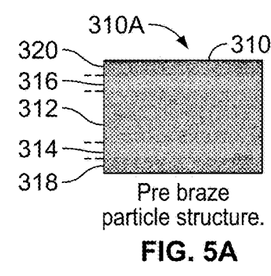
FIGS. 5A-5D are photographs of a cross-section of a sheet material with five layers in accordance with another embodiment of the present disclosure, showing the pre-braze particle structure, the pre-braise grain structure, the post braze particle structure and the post braze grain structure, respectively.
Figure 5B:
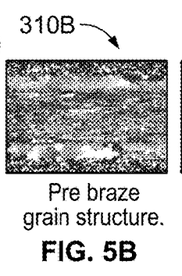
Figure 5C:
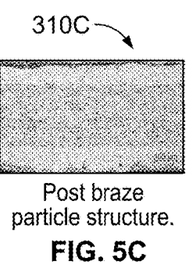
Figure 5D:
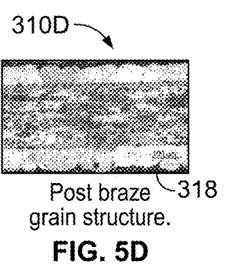

FIGS. 12A-12D show a cross-section of a sample sheet material 910 (sample identified in Tables 2 and 3 as B12-0086 with Core-2 and I/L-1) of 0.5 mm gauge that, in the pre-braze state had five layers, as shown in FIG. 5A. Post braze, the core 912 and interliner layers 914, 916 are discernable. FIGS. 12A-12D show the microstructure after pre-strain of 2.5% (910A), 5% (910B), 7.5% (910C) and 10% (910D), respectively. As shown, the erosion level for each pre-strain level is notably better than that exhibited by the three layer material 71 shown in FIG. 9A.

Figure 6A:
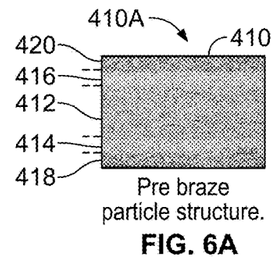
FIGS. 6A-6D are photographs of a cross-section of a sheet material with five layers in accordance with another embodiment of the present disclosure, showing the pre-braze particle structure, the pre-braise grain structure, the post braze particle structure and the post braze grain structure, respectively.
Figure 6B:
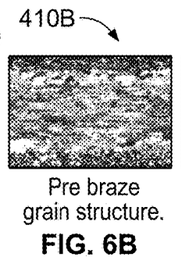
Figure 6C:
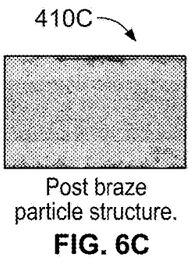
Figure 6D:
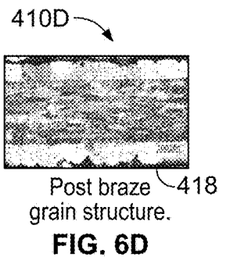

FIGS. 13A-13D show a cross-section of a sample sheet material 1010 (sample identified in Tables 2 and 3 as B12-0087 with Core-2 and I/L-2) of 0.5 mm gauge that, in the pre-braze state had five layers, as shown in FIG. 6A. Post braze, the core 1012 and interliner layers 1014, 1016 are discernable. FIGS. 13A-13D show the microstructure after pre-strain of 2.5% (1010A), 5% (1010B), 7.5% (1010C) and 10% (1010D), respectively. As shown, the erosion level for each pre-strain level is notably better than that exhibited by the three layer material 71 shown in FIG. 9A.

Figure 7A:
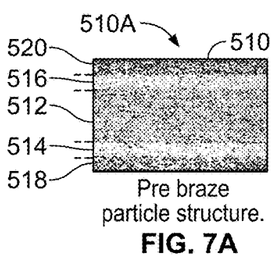
FIGS. 7A-7D are photographs of a cross-section of a sheet material with five layers in accordance with another embodiment of the present disclosure, showing the pre-braze particle structure, the pre-braise grain structure, the post braze particle structure and the post braze grain structure, respectively.
Figure 7B:
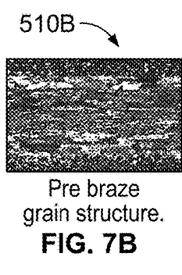
Figure 7C:
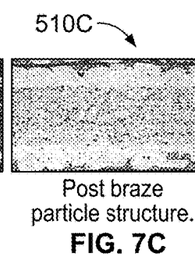
Figure 7D:
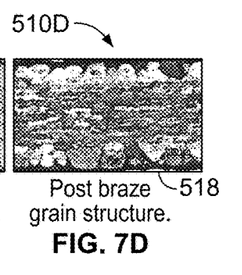

FIGS. 14A-14D show a cross-section of a sample sheet material 1110 (sample identified in Tables 2 and 3 as B12-0088 with Core-2 and I/L-4) of 0.5 mm gauge that, in the pre-braze state had five layers, as shown in FIG. 7A. Post braze, the core 1112 and interliner layers 1114, 1116 are discernable. FIGS. 14A-14D show the microstructure after pre-strain of 2.5% (1110A), 5% (1110B), 7.5% (1110C) and 10% (1110D), respectively. As shown, the sheet 1110 material exhibits erosion at the 2.5% and 5% levels of pre-strain.

Figure 8A:
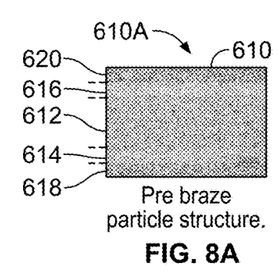
FIGS. 8A-8D are photographs of a cross-section of a sheet material with five layers in accordance with another embodiment of the present disclosure, showing the pre-braze particle structure, the pre-braise grain structure, the post braze particle structure and the post braze grain structure, respectively.
Figure 8B:
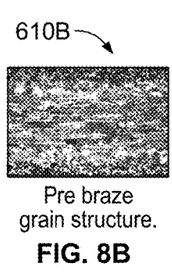
Figure 8C:
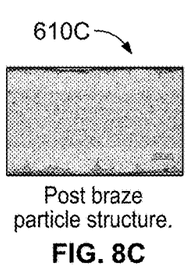
Figure 8D:
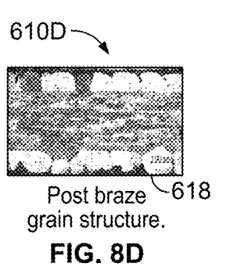
Figure 9A:
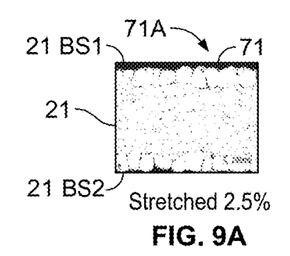
FIGS. 9A-9D are photographs of a cross-section of a sheet material with three layers, in a post braze condition after pre-strain, showing the microstructure after being stretched 2.5%, 5%, 7.5% and 10%, respectively.
Figure 9B:
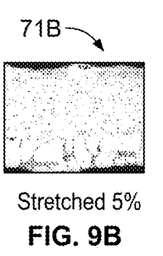
Figure 9C:
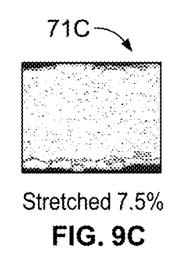
Figure 9D:
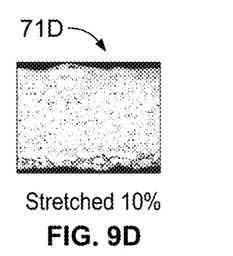
Figure 10A:
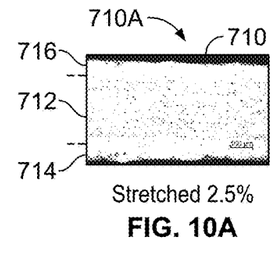
FIGS. 10A-10D are photographs of a cross-section of a sheet material with five layers in accordance with another embodiment of the present disclosure, in a post braze condition after pre-strain, showing the microstructure after being stretched 2.5%, 5%, 7.5% and 10%, respectively.
Figure 10B:
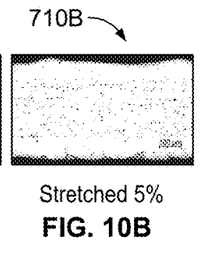
Figure 10C:
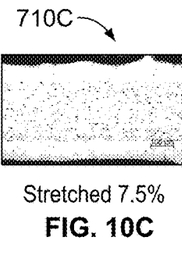
Figure 10D:
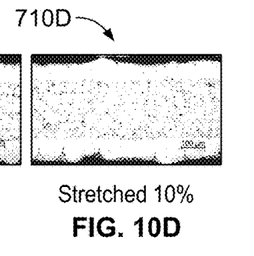
Figures 11A, 11B:
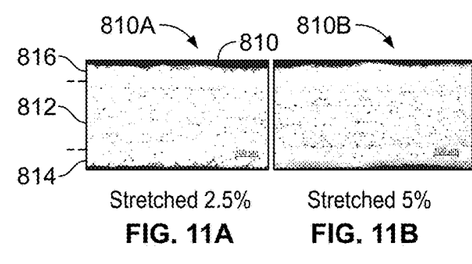
FIGS. 11A-11D are photographs of a cross-section of a sheet material with five layers in accordance with another embodiment of the present disclosure, in a post braze condition after pre-strain, showing the microstructure after being stretched 2.5%, 5%, 7.5% and 10%, respectively.
Figure 11C:
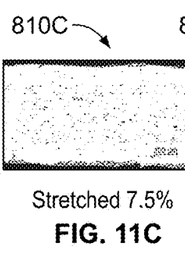
Figure 11D:
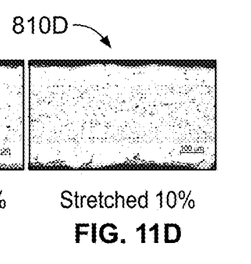
Figure 12A:
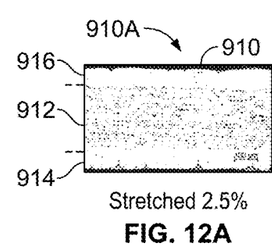
FIGS. 12A-12D are photographs of a cross-section of a sheet material with five layers in accordance with another embodiment of the present disclosure, in a post braze condition after pre-strain, showing the microstructure after being stretched 2.5%, 5%, 7.5% and 10%, respectively.
Figure 12B:
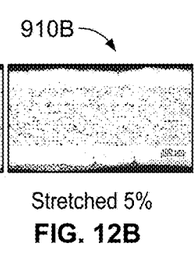
Figure 12C:
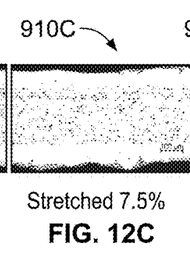
Figure 12D:
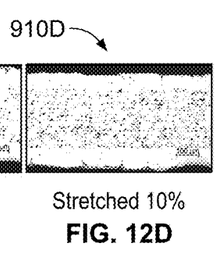
Figure 13A:
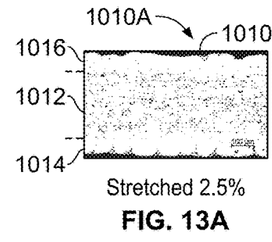
FIGS. 13A-13D are photographs of a cross-section of a sheet material with five layers in accordance with another embodiment of the present disclosure, in a post braze condition after pre-strain, showing the microstructure after being stretched 2.5%, 5%, 7.5% and 10%, respectively.
Figure 13B:
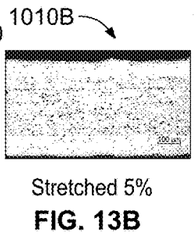
Figures 13C, 13D:
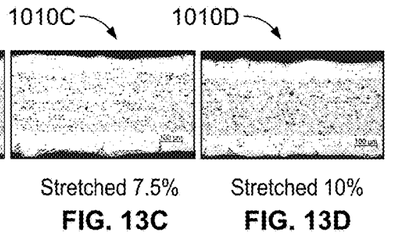
Figure 14A:
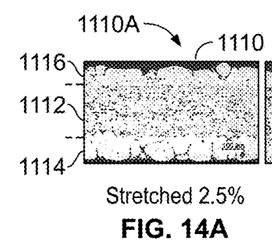
FIGS. 14A-14D are photographs of a cross-section of a sheet material with five layers in accordance with another embodiment of the present disclosure, in a post braze condition after pre-strain, showing the microstructure after being stretched 2.5%, 5%, 7.5% and 10%, respectively.
Figure 14B:
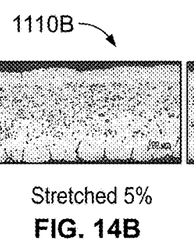
Figures 14C, 14D:
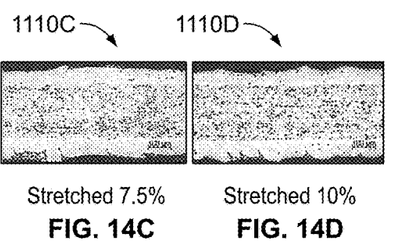
Figure 15A:
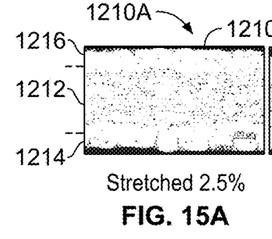
FIGS. 15A-15D are photographs of a cross-section of a sheet material with five layers in accordance with another embodiment of the present disclosure, in a post braze condition after pre-strain, showing the microstructure after being stretched 2.5%, 5%, 7.5% and 10%, respectively.
Figure 15B:
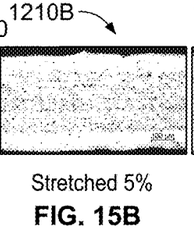
Figures 15C, 15D:
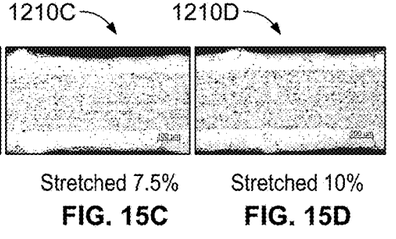

FIGS. 15A-15D show a cross-section of a sample sheet material 1210 (sample identified in Tables 2 and 3 as B12-0089 with Core-2 and I/L-3) of 0.5 mm gauge that, in the pre-braze state had five layers, as shown in FIG. 8A. Post braze, the core 1212 and interliner layers 1214, 1216 are discernable. FIGS. 15A-15D show the microstructure after pre-strain of 2.5% (1210A), 5% (1210B), 7.5% (1210C) and 10% (1210D), respectively. As shown, the erosion level for each pre-strain level is notably better than that exhibited by the three layer material 71 shown in FIG. 9A.

SWAAT

Figure 16A:
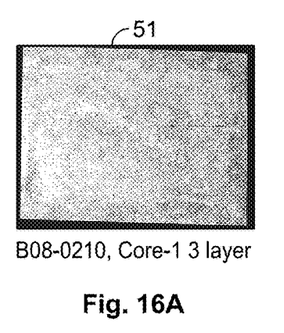
FIG. 16A is a photograph of a surface of a sheet material with three layers, in a post braze condition after being subjected to a SWAAT test for 30 days.
Figure 16B:
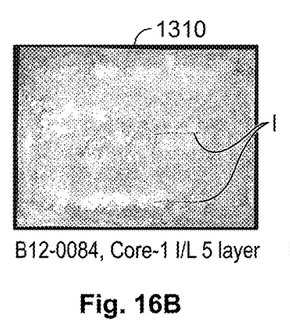
FIGS. 16B-16F are photographs of surfaces of sheet material with five layers in accordance with embodiments of the present disclosure, in a post braze condition after being subjected to a SWAAT test for 30 days.
Figure 16C:
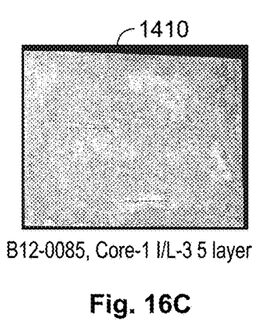
Figure 16D:
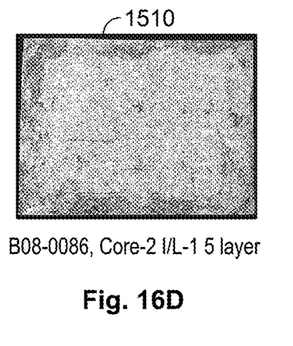
Figure 16E:
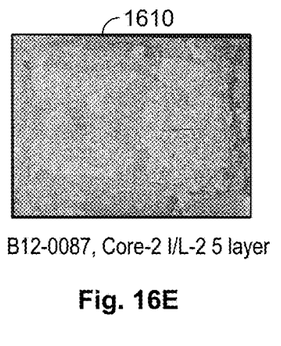
Figure 16F:
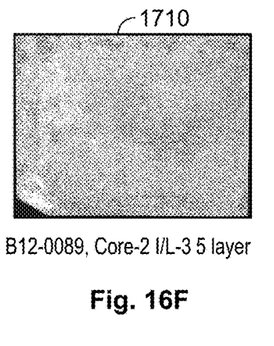

FIG. 16A shows a side surface of a three layer sheet material 51 (material B08-210 listed in Tables 2 and 3) on the side with BS-Liner 1 (described in Table 1), in a post braze condition after being subjected to a SWAAT test for 30 days.

FIGS. 16B-16F show surfaces of sheet material 1310, 1410, 1510, 1610 and 1710 with five layers (samples B12-0084, B12-0085, B12-0086, B12-0087 and B12-0089, respectively, as identified in Tables 2 and 3) in accordance with embodiments of the present disclosure, in a post braze condition after being subjected to a SWAAT test for 30 days. The surfaces shown in FIGS. 16B-16F are on the BS-Liner 1 side. Severe corrosion attack is seen on the cross sectional sample of the 3 layer material 51, as described below. The samples are marked with indicia I, i.e., lines marked "C" and "E", indicating center and edge, respectively, where the samples may be cut to obtain a cross-sectional view. For all of the 5 layer samples, the interliner layers 14, 16 provided sacrificial protection to the core 12 (FIG. 1). This is also shown in the following figures.

Figure 17A:
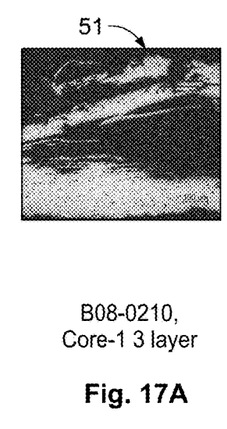
FIG. 17A is a photograph of a cross-section of one side of a sheet material with three layers, after being subjected to a SWAAT test for 30 days.
Figure 17B:
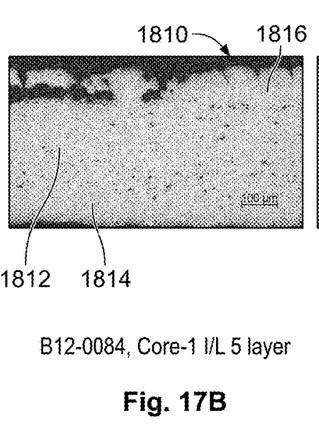
FIGS. 17B-17F are photographs of a cross-section of one side of a sheet material with five layers in accordance with embodiments of the present disclosure, after being subjected to a SWAAT test for 30 days.
Figure 17C:
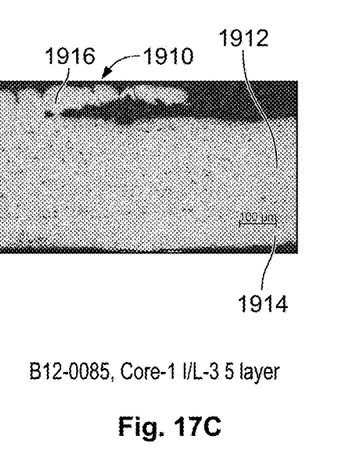
Figure 17D:
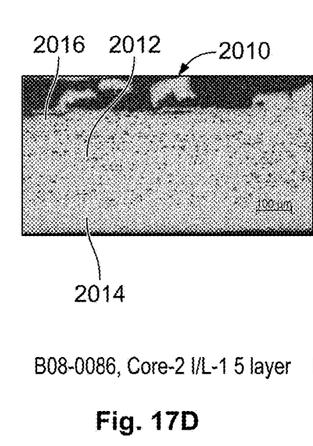
Figure 17E:
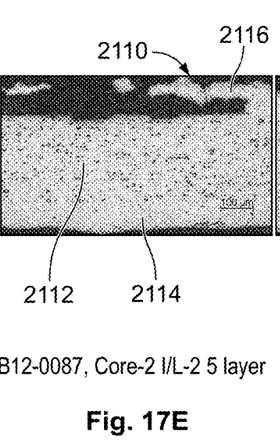
Figure 17F:
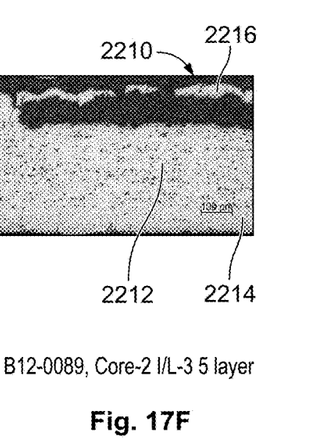

FIG. 17A shows a cross-section of one side (BS Liner-1 side) of a three layer sheet material 51 (material B08-210 listed in Tables 2 and 3), post braze, after being subjected to a SWAAT test for 30 days.

FIGS. 17B-17F shows five layer sheet materials 1810, 1910, 2010, 2110 and 2210 (samples B12-0084, B12-0085, B12-0086, B12-0087 and B12-0089, respectively, as identified in Tables 2 and 3) in accordance with embodiments of the present disclosure, in a post braze condition after being subjected to a SWAAT test for 30 days. The cross-sections shown in FIGS. 17B-17F are on the BS-Liner 1 side. Severe corrosion attack is seen on the cross sectional sample of the three layer material 51. For all of the five layer sheet materials 1810, 1910, 2010, 2110 and 2210 (samples B12-0084, B12-0085, 612-0086, B12-0087 and B12-0089), the respective interliner layers 1814, 1816, 1914, 1916, 2014, 2016, 2114, 2116, 2214, 2216 provided sacrificial protection to the respective cores 1812, 1912, 2012, 2112, 2212.

Figure 18A:
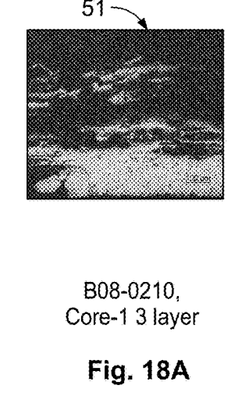
FIG. 18A is a photograph of a cross-section of another side of the sheet material of FIG. 17A, after being subjected to a SWAAT test for 30 days.
Figure 18B:
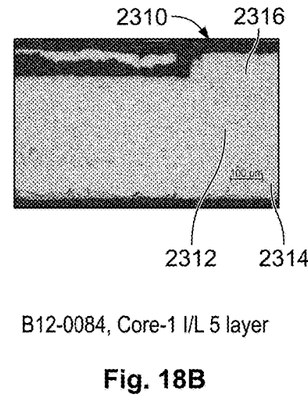
FIGS. 18B-18F are photographs of a cross-section of another side of the sheet materials of FIGS. 17B-17F, after being subjected to a SWAAT test for 30 days.
Figure 18C:
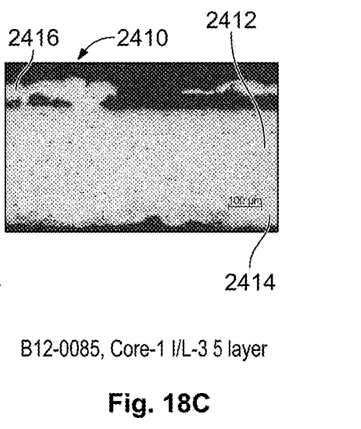
Figure 18D:
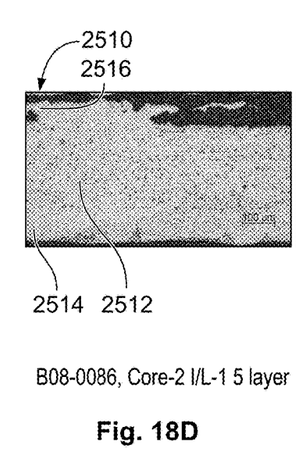
Figure 18E:
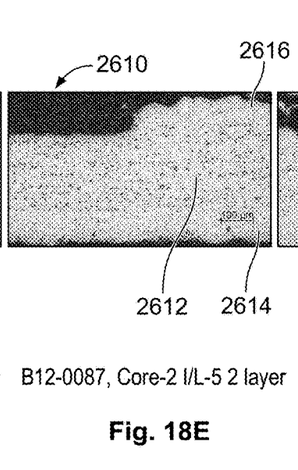
Figure 18F:
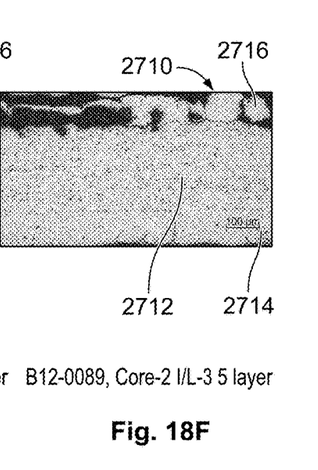

FIG. 18A shows a cross-section of one side (BS Liner-2 side) of a sheet material 51 (material B08-210 listed in Tables 2 and 3) with three layers, after being subjected to a SWAAT test for 30 days.

FIG. 18B-18F show five layer sheet materials 2310, 2310, 2510, 2610 and 2710 (samples B12-0084, B12-0085, B12-0086, B12-0087 and B12-0089, respectively, as identified in Tables 2 and 3) in accordance with embodiments of the present disclosure, in a post braze condition after being subjected to a SWAAT test for 30 days. The cross-sections shown in FIGS. 18B-18F are on the BS-Liner 2 side. Severe corrosion attack is seen on the cross sectional sample of the three layer material 51. For all of the five layer sheet materials 2310, 2310, 2510, 2610 and 2710 (samples B12-0084, B12-0085, 612-0086, B12-0087 and B12-0089), the respective interliner layers 2314, 2316, 2414, 2416, 2514, 2516, 2614, 2616, 2714, 2716 provided sacrificial protection to the respective cores 2312, 2412, 2512, 2612, 2712.

Figure 19A:
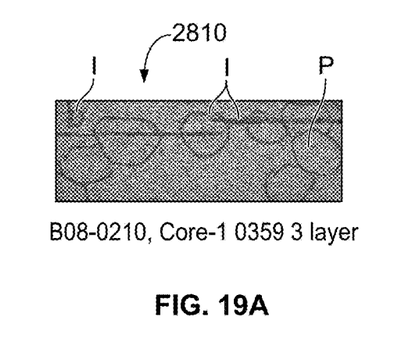
FIG. 19A is a photograph of a surface of a sheet material with three layers, after being subjected to an OY test, with corrosion pits marked.
Figure 19B:
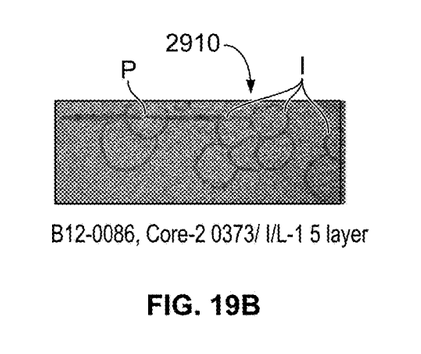
FIGS. 19B-19F are photographs of surfaces of sheet material with five layers in accordance with embodiments of the present disclosure, after being subjected to an OY test, with corrosion pits marked.
Figure 19C:
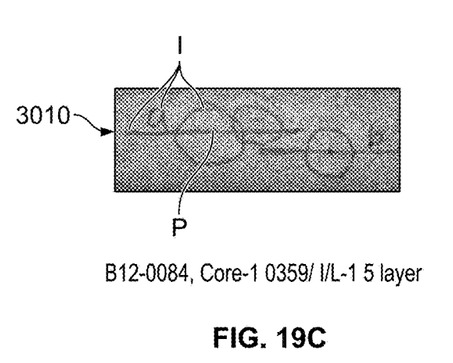
Figure 19D:
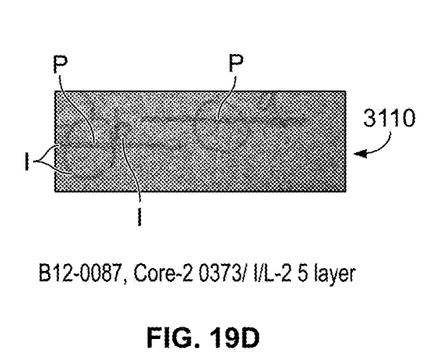
Figure 19E:
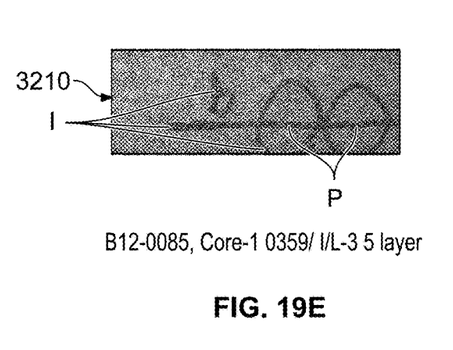
Figure 19F:
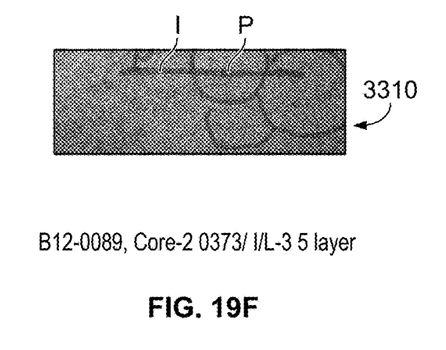

FIG. 19A shows a side surface of a sheet material 51 (material B08-210 listed in Tables 2 and 3) on the side with BS-Liner 1 (described in Table 1), in a post braze condition after being subjected to an OY test at a flow rate of 2.5 m/sec. for 200 hours, with corrosion pits P marked with indicia I (hand-drawn circle, lines and letters indicating the position of the pits to make them and their relative locations more visible and more readily examinable, e.g., by taking a cross-sectional cut along the lines marked thorough the pits P).

FIGS. 19B-19F show five layer sheet materials 2910, 3010, 3110, 3210 and 3310 (samples B12-0086, B12-0084, B12-0087, B12-0085 and B12-0089, respectively, as identified in Tables 2 and 3) in accordance with embodiments of the present disclosure, on the side with BS-Liner 1 (described in Table 1) in a post braze condition after being subjected to an OY test at a flow rate of 2.5 m/sec. for 200 hours, with corrosion pits P marked with indicia I.

Figure 20A:
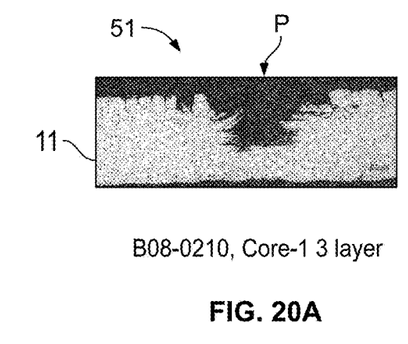
FIG. 20A is a photograph of a cross-section of a three layer sheet material, post braze, after being subjected to an OY test, showing an area with a corrosion pit.
Figure 20B:
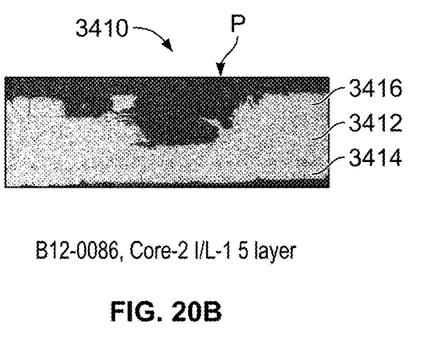
FIGS. 20B-20F are photographs of cross-sections of five layer sheet materials, post braze, in accordance with embodiments of the present disclosure, after being subjected to an OY test, showing areas with corrosion pits.
Figure 20C:
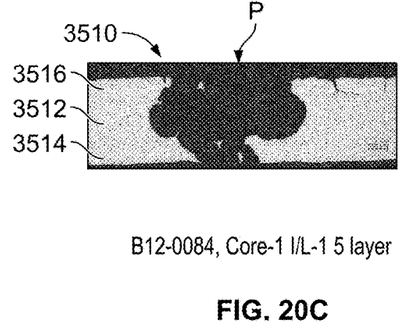
Figure 20D:
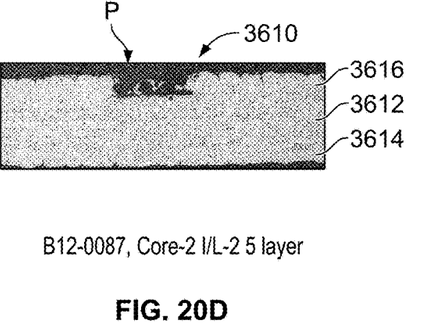
Figure 20E:
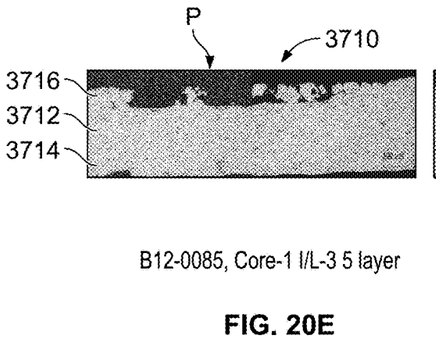
Figure 20F:
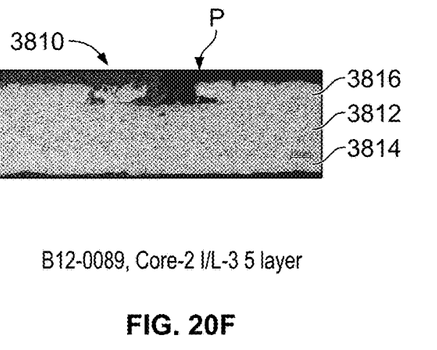

FIG. 20A shows a cross-section of one side (BS Liner-1 side) of a three layer sheet material 51 (material B08-210 listed in Tables 2 and 3) post braze, on the side with BS-Liner 1 (described in Table 1) after being subjected to an OY test, showing the core 11 in an area with a corrosion pit P.

FIGS. 20B-20F show five layer sheet materials 3410, 3510, 3610, 3710 and 3810 (samples B12-0086 (Core-2 I/L-1), B12-0084 (Core-1 I/L-1), B12-0087 (Core-2 I/L-2), B12-0085 (Core-2 I/L-3) and B12-0089 (Core-2 I/L-3), respectively, as identified in Tables 2 and 3) in accordance with embodiments of the present disclosure, on the side with BS-Liner 1 (described in Table 1) in a post braze condition after being subjected to an OY test at a flow rate of 2.5 m/sec. for 200 hours. Compared to FIG. 20A, it appears that the respective interliner layers 3414, 3416, 3514, 3516 (Interliner-1) in FIGS. 20B and 20C do not provide sufficient protection, but that interliner layers 3614, 3616, 3714, 3716 3814, 3816 (I/L-2 and I/L-3) provide sacrificial protection of the cores 3612, 3712, 3812 in FIGS. 20D, 20E and 20F, respectively.

Figure 21A:
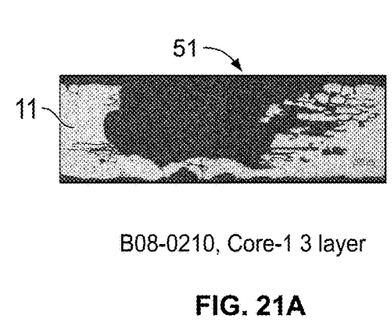
FIG. 21A is a photograph of a cross-section of a three layer sheet material, post braze, after being subjected to an OY corrosion test, showing an area with a corrosion pit.
Figure 21B:
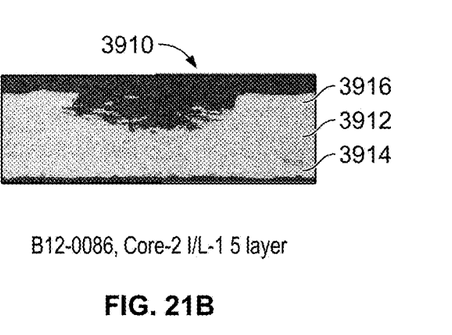
FIGS. 21B-21F are photographs of cross-sections of five layer sheet materials, post braze, in accordance with embodiments of the present disclosure, after being subjected to an OY test, showing areas with corrosion pits.
Figure 21C:
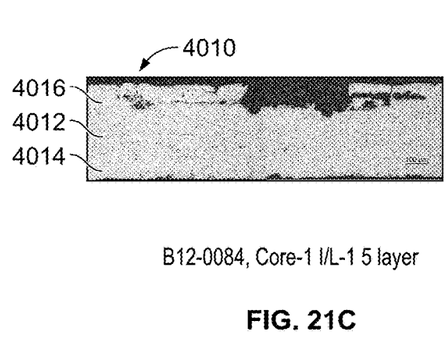
Figure 21D:
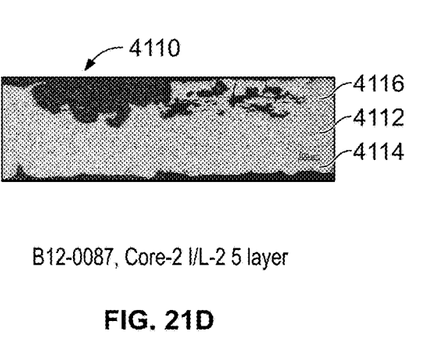
Figure 21E:
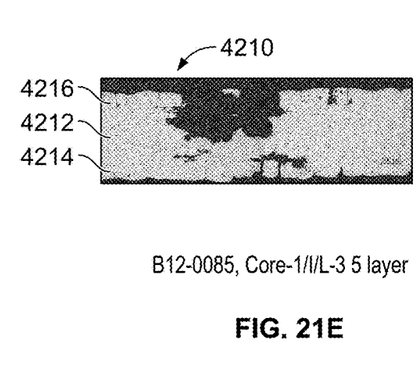

FIG. 21A shows a cross-section of one side of a three layer sheet material 51 (material B08-210 listed in Tables 2 and 3) on the side with BS-Liner 2 (described in Table 1), post braze, after being subjected to an OY test, showing an area with a corrosion pit. The corrosion is more severe on the BS-Liner 2 side than on the BS-Liner 1 side and the sheet was perforated by the corrosion pit P.

FIGS. 21B-21F show five layer sheet materials 3910, 3910, 4010, 4110 and 4210 (samples B12-0086 (Core-2 I/L-1), B12-0084 (Core-1 I/L-1), B12-0087 (Core-2 I/L-2), B12-0085 (Core-2 I/L-3) and 612-0089 (Core-2 I/L-3), respectively, as identified in Tables 2 and 3) in accordance with embodiments of the present disclosure, on the side with BS-Liner 2 (described in Table 1) in a post braze condition after being subjected to an OY test at a flow rate of 2.5 m/sec. for 200 hours. Compared to FIG. 21A, it appears that the respective interliner layers 3914, 3916, 4014, 4016 (Interliner-1) in FIGS. 21B and 21C, as well as interliner layers 4114, 4116, 4214, 4216, 4314, 4316 (I/L-2 and I/L-3) provide sacrificial protection of the cores 3912, 4012, 4112, 4212, 4312 in FIGS. 20B-20F, respectively. While significant corrosion is evident, there is substantial improvement in the five layer samples over that of the three layer sample. As can be appreciated from the above, the corrosion attack in the OY test was more severe on the BS Liner-2 side, such that the corrosion pit perforated the 3 layer material 51. The corrosion pits on the bottom of materials 4210 and 4310 (samples B12-0085 and B12-0089 shown in FIGS. 21E and 21F were thought to be due to the OY water entering from the tape on the back side of the sample.

Figure 21F:
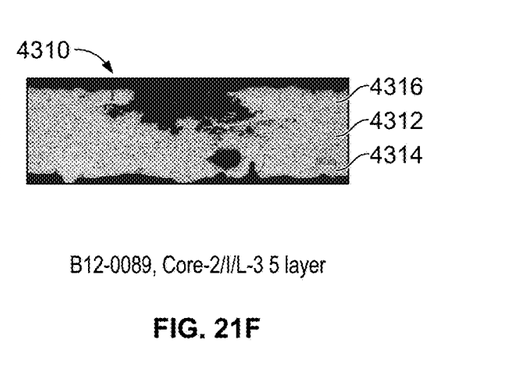

In general, the experimental results show the following properties provided by the interliner layers 14, 16 in the five layer materials 10: a) lower pre-braze strengths but higher post braze strengths than the 3 layer material 51; (This property can provide good formability, e.g., for forming heat exchanger components and high strength for the resultant product, e.g., heat exchanger.) b) significant improvement in the core 12 erosion behavior at low pre strain; c) sacrificial protection for the core to improve the corrosion life of the material 10. The 5 layer material with Core-1 and I/L-3, e.g., material 4210 in FIG. 21E has post braze strengths slightly higher than the 3 layer Core-1 material 51 and better erosion behavior and corrosion property than the 3 layer material. The five layer material 10 with Core-2 and I/L-3, e.g.

material 4310 in FIG. 21F, has above 20% higher post braze strengths, and better erosion behavior and corrosion property than the 3 layer Core-1 material 51.

It will be understood that the embodiments described herein are merely exemplary and that a person skilled in the art may make many variations and modifications without departing from the spirit and scope of the claimed subject matter. All such variations and modifications are intended to be included within the scope of the disclosure.

I claim:

1. A sheet material for brazing, comprising:
a core of a homogenized 3xxx aluminum alloy;
a first interliner on a first side of the core;
a second interliner on a second side of the core;
a first braze liner on the first interliner;
and a second braze liner on the second interliner, wherein the first and second interliners are formed from an aluminum alloy having, in weight %; 0.1-0.40 Si; 0.10-0.5 Fe; up to 0.05 Cu; up to 0.3 Mn; 0.3-1.10 Mg; up to 0.05 Cr; up to 0.05 Zn; 0.05-0.2 Ti, the remainder being aluminum and impurities and wherein the first and second braze liners are each formed from a 4xxx aluminum alloy.

2. The sheet material of claim 1, wherein the first and second interliners comprise, in weight %, 0.12-0.4 Si.

3. The sheet material of claim 1, wherein the first and second interliners comprise in weight %, up to 0.4 Fe.

4. The sheet material of claim 1, wherein the first and second interliners comprise, in weight %, up to 0.03 Cu.

5. The sheet material of claim 1, wherein the first and second interliners comprise, in weight %, up to 0.3 Mn.

6. The sheet material of claim 1, wherein the first and second interliners comprise, in weight %, 0.3-1.0 Mg.

7. The sheet material of claim 1, wherein the first and second interliners each comprise, in weight %, up to 0.03 Cr.

8. The sheet material of claim 1, wherein the first and second interliners each comprise, in weight %, up to 0.03 Zn.

9. The sheet material of claim 1, wherein the first and second interliners each comprise, in weight %, up to 0.3 Fe.

10. The sheet material of claim 1, wherein the first and second interliners each comprise, in weight %, 0.08-0.16 Ti.

11. The material of claim 1, wherein the core layer is treated by a pre-hot rolling thermal treatment.

12. The material of claim 1, wherein the first braze liner and the second braze liner each have a max Zn level of 0.2 wt %.

13. The material of claim 1, wherein the first braze liner and the second braze liner each have Mg in an amount from 0.16 to 2.5 wt %.

14. The material of claim 1, wherein the core comprises in wt % 0.1 to 1.0 Si, up to 0.6 Fe, 0.3 to 0.8 Cu, 1.0 to 1.6 Mn, 0.1 to 0.6 Mg, up to 0.03 Cr, up to 0.05 Zn and 0.1-0.2 Ti, the remainder being Al and impurities.

15. The material of claim 14, wherein the core comprises in wt % 0.05-0.1 Si, 0.1-0.2 Fe, 0.4-0.6 Cu, 1.0-1.3 Mn, 0.1-0.3 Mg, 0.002-0.006 Cr, 0.01-0.02 Zn and 0.15-0.18 Ti.

16. The material of claim 14, wherein the core comprises in wt % 0.5 to 0.9 Si, 0.3 to 0.7 Fe, 0.4 to 0.7 Cu, 1.0 to 1.5 Mn, 0.2 to 0.5 Mg.

17. The material of claim 12, wherein Zn is not purposely added to either of the first braze liner or the second braze liner.

18. The material of claim 1, wherein at least one of the first interliner or the second interliner comprise in wt % 0.2-0.4 Si, 0.1-0.2 Fe, 0.01-0.04 Cu, 0.01-0.05 Mn, 0.3-0.5 Mg, 0.01-0.04 Cr and 0.01-0.04 Zn and 0.02 0.08 Ti.

19. The material of claim 1, wherein at least one of the first interliner or the second interliner comprise in wt % 0.1-0.18 Si, 0.13-0.2 Fe, 0.001-0.01 Cu, 0.001-0.005 Mn, 0.4-0.7 Mg and 0.001-0.006 Zn.

20. The material of claim 1, wherein at least one of the first interliner or the second interliner comprise in wt % 0.1-0.18 Si, 0.13-0.2 Fe, 0.001-0.003 Cu, 0.001-0.005 Mn, 0.5-1.05 Mg and 0.001-0.005 Zn.

21. The material of claim 1, wherein the first braze liner in wt % 9.0 11.0 Si, up to 1.0 Fe, 0.1-0.3 Cu, up to 0.20 Mn, 0.5-2.5 Mg, up to 0.05 Zn, the remainder being Al and impurities.

22. The material of claim 1, wherein the second braze liner in wt % 11.5-12.5 Si, 0.1-0.3 Fe, 0.1-0.3 Cu, 0.01-0.1 Mn, 0.1-0.2 Mg, 0.001-0.01 Cr, 0.01-0.05 Zn and 0.01-0.02 Ti, the remainder being Al and impurities.

23. The material of claim 21, wherein the second braze liner comprises in wt % 11.5-12.5 Si, 0.1-0.3 Fe, 0.1-0.3 Cu, 0.01-0.1 Mn, 0.1-0.2 Mg, 0.001-0.01 Cr, 0.01-0.05 Zn and 0.01-0.02 Ti, the remainder being Al and impurities.

24. The material of claim 15, wherein the first braze liner and the second braze liner are the first braze liner and the second braze liner of claim 23.

25. The material of claim 16, wherein the first braze liner and the second braze liner are the first braze liner and the second braze liner of claim 23.

26. The material of claim 1, wherein the clad ratio is 8-18% for each of the first braze liner and the second braze liner and 8-18% for each of the first interliner and the second interliner.

* * * * *